E. R. MAGNUS.
ARTIFICIAL TOOTH AND MOUNTING OF SAME.
APPLICATION FILED FEB. 23, 1916.
1,219,019.  Patented Mar. 13, 1917.
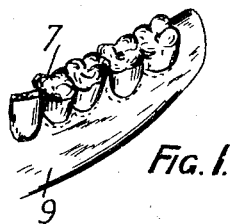
Fig. 1.
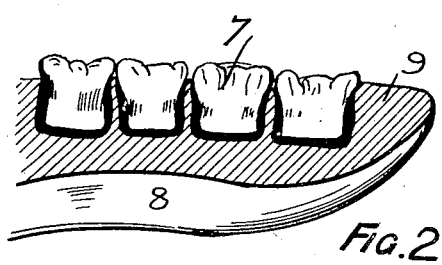
Fig. 2.
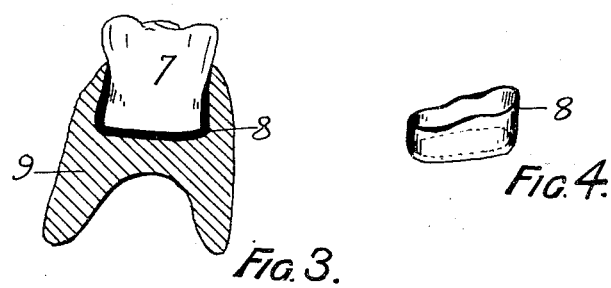 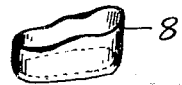
Fig. 3.  Fig. 4.
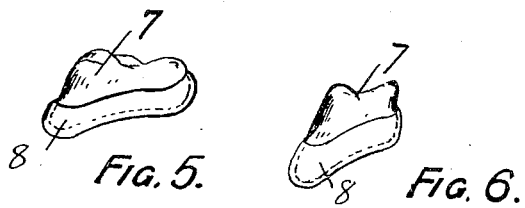
Fig. 5.  Fig. 6.
E. R. Magnus,
Inventor.
By Bwzdow Marko
Attorney.

UNITED STATES PATENT OFFICE.

EDWIN RANDOLPH MAGNUS, OF SYDNEY, NEW SOUTH WALES, AUSTRALIA.

ARTIFICIAL TOOTH AND MOUNTING OF SAME.

1,219,019.   Specification of Letters Patent.   Patented Mar. 13, 1917.

Application filed February 23, 1916. Serial No. 79,907.

*To all whom it may concern:*

Be it known that I, EDWIN RANDOLPH MAGNUS, a subject of the King of Great Britain and Ireland, residing at Wyoming, 175 Macquarie street, Sydney, in the State of New South Wales and Commonwealth of Australia, dental surgeon, have invented certain new and useful Improvements in and Relating to Artificial Teeth and in the Mounting of Same, of which the following is a specification.

This invention refers to artificial denture and relates to improvements in the teeth and in the mounting of same.

The object of the invention is to provide a simple, effective and easily applied cushion at the base of the back teeth so that a slight movement is obtained in the plate which adds greatly to the comfort of the wearer, the movement of the teeth during mastication being closely approximate to that of natural teeth.

The invention consists essentially of a slipper of rubber or other suitable resilient material which is adapted to fit tightly over the base of each tooth prior to being fixed in the plate. Each tooth may if necessary be prepared to receive the slipper by being slightly grooved at the sides and back. The resilient slipper is shaped to fit tightly over the tooth and has its greatest thickness at the bottom, the wall or sides tapering off toward the top edge.

But in order that the invention may be more clearly understood reference will now be made to the drawings which accompany and form part of this complete specification and in which:—

Figure 1 is an elevation of a portion of a plate showing the back teeth mounted according to this invention.

Fig. 2 is an enlarged longitudinal sectional elevation.

Fig. 3 is an enlarged cross sectional elevation.

Fig. 4 is an enlarged elevation showing one form of resilient slipper.

Figs. 5 and 6 are enlarged elevations showing teeth fitted with slippers prior to being fixed in the plate.

The teeth 7 are slightly grooved at the sides and back as shown so as to prepare them to receive the slipper 8 which is constricted to fit tightly thereon as shown in Figs. 5 and 6. The sides of the slipper taper off toward the top edge while the bottom has considerable thickness to form a cushion when mounted in the base plate. After the teeth have been fitted with the soft rubber slippers they are mounted in the base plate in the usual way. The plate material 9 which forms the artificial gums extends to and corresponds with the top edges of the slippers so as to permit of a slight movement of the teeth during mastication. When vulcanite is used as the material for the base plate the soft rubber slipper amalgamates with same after vulcanizing and forms a homogeneous mass, but the slipper still retains sufficient resilience to give the required cushion at the sides and base of the tooth.

I claim:—

An artificial tooth structure comprising a tooth, a resilient slipper extending over the base and sides of the tooth and a base plate in which such tooth and slipper is embedded, said slipper being entirely embedded in said base plate.

In testimony whereof I affix my signature in presence of two witnesses.

EDWIN RANDOLPH MAGNUS.

Witnesses:
 T. O. ALLEN, J. P.,
 HELEN B. CAMPBELL.